Figure 1:
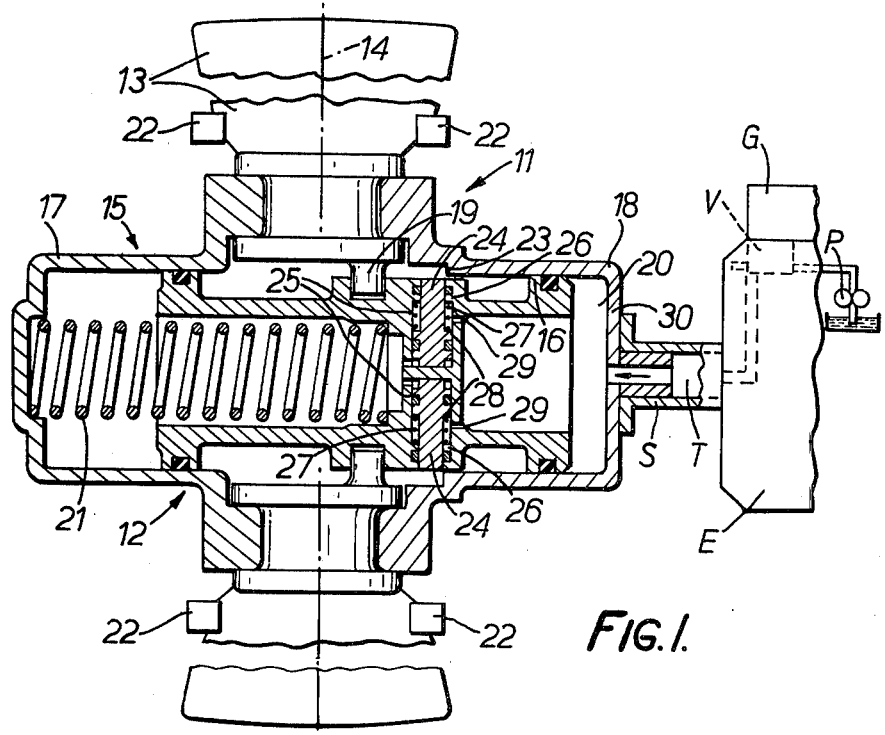

United States Patent [19]

Chilman

[11] 4,037,986
[45] July 26, 1977

[54] BLADED ROTORS HAVING CONTROL MEANS FOR EFFECTING BLADE PITCH ADJUSTMENT

[75] Inventor: John Alfred Chilman, Stroud, England

[73] Assignee: Dowty Rotol Limited, Gloucester, England

[21] Appl. No.: 610,376

[22] Filed: Sept. 4, 1975

[51] Int. Cl.² .................................................. B64C 11/40
[52] U.S. Cl. ..................................... 416/46; 416/154; 416/157 R
[58] Field of Search ................. 416/46, 153, 157, 154

[56] References Cited

U.S. PATENT DOCUMENTS

| | | | |
|---|---|---|---|
| 2,343,416 | 3/1944 | Keller | 416/46 |
| 2,368,950 | 2/1945 | Thomas | 416/154 |
| 2,722,985 | 11/1955 | Biermann | 416/46 |
| 2,948,344 | 8/1960 | Biermann | 416/157 X |
| 2,974,729 | 3/1961 | Voisard | 416/46 |
| 2,992,687 | 7/1961 | Brett et al. | 416/46 |
| 3,115,937 | 12/1963 | Biermann | 416/46 |
| 3,167,131 | 1/1965 | Voisard | 416/154 |
| 3,207,227 | 9/1965 | Timewell | 416/46 |
| 3,637,323 | 1/1972 | Chilman et al. | 416/153 X |
| 3,792,937 | 2/1974 | Chilman | 416/157 |

FOREIGN PATENT DOCUMENTS

| | | | |
|---|---|---|---|
| 534,529 | 3/1941 | United Kingdom | 416/154 |

*Primary Examiner*—Everette A. Powell, Jr.
*Attorney, Agent, or Firm*—Young & Thompson

[57] ABSTRACT

Control means, for effecting the pitch-adjustment of a rotor blade, includes an actuator urgeable by biassing means in one direction for adjusting pitch in one sense and being subjectable to fluid pressure for movement in the opposite direction, against the action of the biassing means, for adjusting pitch in the other sense. Stop means is provided which is also subjectable to said fluid pressure, being maintained in an inoperative position when the pressure is above a predetermined value and being movable into an operative position when the pressure falls below that predetermined value. Abutment means is engageable by the stop means, when in its operative position, to arrest movement of the actuator at a predetermined position when moving in said one direction.

10 Claims, 2 Drawing Figures

BLADED ROTORS HAVING CONTROL MEANS FOR EFFECTING BLADE PITCH ADJUSTMENT

This invention relates to control means, for example, for effecting the pitch-adjustment of a rotor blade.

According to the invention control means, for effecting the pitchadjustment of a rotor blade, includes an actuator urgeable by biassing means in one direction for adjusting pitch in one sense and being subjectable to fluid pressure for movement in the opposite direction, against the action of said biassing means, for adjusting pitch in the other sense, stop means also subjectable to said fluid pressure, being maintained in an inoperative position when the pressure is above a predetermined value and being movable into an operative position when the pressure falls below that predetermined value, and abutment means engageable by said stop means, when in its operative position, to arrest movement of the actuator at a predetermined position when moving in said one direction.

The actuator may be adapted to be carried by, and to rotate with, a bladed rotor.

The said one sense of pitch-adjustment may be in the blade pitchcoarsening direction.

Where the actuator is fitted to a bladed rotor, the stop means may be arranged to be so responsive to centrifugal force during rotation of the rotor above a predetermined speed that upon said fluid pressure falling below said predetermined value the stop means automatically moves to its operative position under centrifugal force. When, with said fluid pressure still below the predetermined value, the rotor falls below said predetermined speed, the stop means is capable, as a result of lessening centrifugal force, of being urged by spring means to its inoperative position to permit the actuator to move in said one direction beyond said predetermined position.

The actuator may comprise a cylinder, housed in or formed by the hub of said bladed rotor, and a piston, one end face of which is subjectable to said fluid pressure, said piston being reciprocable in the cylinder and connected to effect blade pitch-adjustment.

The stop means may comprise radially-directed plungers slidably mounted in guides in said piston and said abutment means be formed in said cylinder. In this case the plungers in their operative positions project radially from the piston so as then to be engageable with the abutment means, and said plungers in their inoperative positions are retracted in the piston.

The said biassing means may include a coil spring, which bears upon said piston, and/or blade-mounted counterweights.

The cylinder may include further abutment means positioned to ensure that movement of the actuator beyond said predetermined position is arrested at a position corresponding to the feathered blade condition.

The said fluid pressure may be derived from a source external of the bladed rotor and be applied to said actuator under the control of speed-responsive governor means and/or positional control valve means.

Alternatively, the said fluid pressure may be derived from pumping means contained within the hub of the bladed rotor and operative, upon relative rotation of the rotor with respect to non-rotative structure, to draw fluid from a reservoir also contained within the hub and rotatable therewith, the fluid discharged by the pumping means being applied to said actuator by way of hub-mounted valve means. The valve means may be operable by hub-mounted speed responsive governor means.

Figure 2:
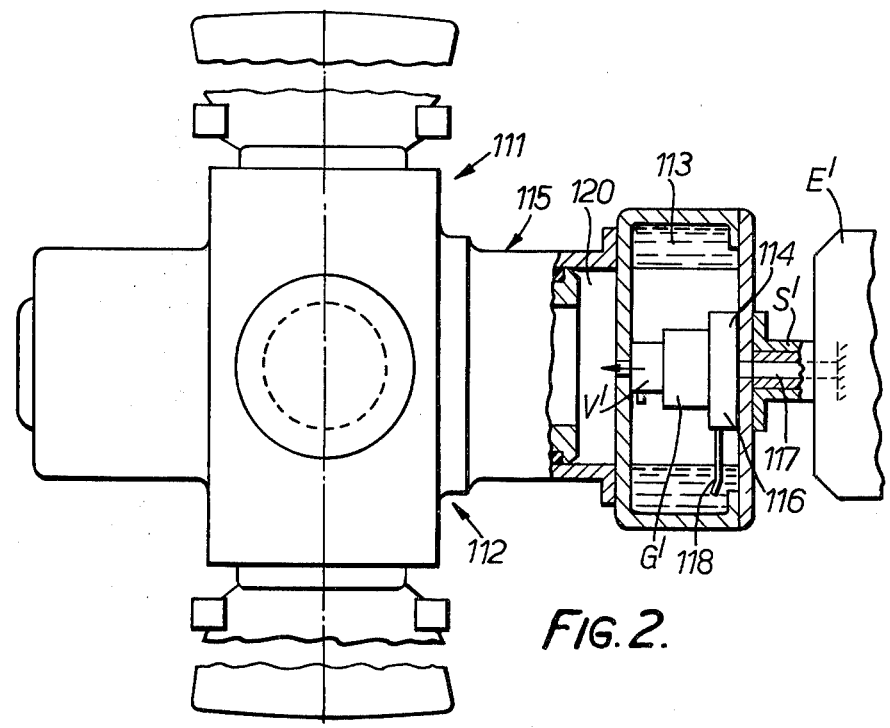

Two embodiments of the invention will now be particularly described by way of example with reference to the accompanying diagrammatic drawing, of which, FIG. 1 is a cross-sectional elevation of a bladed rotor, and, FIG. 2 is a partial cross-sectional elevation of a bladed rotor similar to that of FIG. 1, but of self-contained form.

In FIG. 1 a bladed rotor 11, suitable as the rotative fan of a ducted propulsor for propulsion of an aircraft, and intended to be driven by a shaft S from and engine E, partly shown, of the reciprocatory piston kind or rotation in a duct (not shown), comprises a hub 12 in which are mounted a plurality of blades 13. The blades are arranged to be variable in pitch about their longitudinal axes 14 under the control of control means in the form of a pitch-change actuator 15. The actuator comprises a piston 16 which is slidably mounted in cylindrical portions 17 and 18 formed integrally with the hub 12. Such a hub construction is disclosed in the specification of my U.S. Pat. No. 3,792,937.

In this embodiment the pitch-change actuator is of singleacting kind in that the piston 16 is movable to the left in the drawing for adjustment of the blades 13 by way of crank pins 19 in the pitchfining direction, such movement being under liquid pressure supplied to the chamber 20 to the right in the drawing of the piston 16. This movement is against the effort of biassing means comprising a coil spring 21 and counterweights 22 fast with the blades. Thus the spring 21 and the counterweights 22 provide a pitch-coarsening bias which overbalances moments about the blade longitudinal axes resulting from centrifugal twisting of the blades during rotation of the rotor. When the pressure of liquid in the chamber 20 falls below a predetermined value the piston is capable of driving the blades 13 by way of the crank pins 19 to the feathered condition.

The cylindrical portion 18 is provided with an abutment in the form of a shoulder 23 in the predetermined position shown, and the piston 16 is provided with stop means in the form of plungers 24 housed in guides 25 arranged radially within the piston. Each guide is provided with a shoulder 26 and a coil spring 27 is interposed between each shoulder 26 and one end face 28 of a land formed on the respective plunger.

In the drawing the plungers are shown in their retracted, inoperative, positions with respect to the piston, being held there by liquid under pressure supplied from a source external of the rotor to the chamber 20, this liquid gaining access to the end faces 28 of the plungers by way of respective ports 29.

Supply of this liquid to the chamber 20 is from an engine pump P, being by way of valve means V, which is operable by speed-responsive governor means G, and by way of liquid transfer means T associated with the engine output shaft S. With the plungers 24 held retracted as shown, governor-controlled pitch-changing operation of the blades 13 occurs in a normal pitch-changing range in which the cruise blade angle is of the order of 40°.

If, during such operation whilst the aircraft is in flight, the liquid pressure in the chamber 20, due to some malfunctioning, falls below the said predetermined value, the pressure on the faces 28 likewise falls and the centrifugal force acting upon the plungers 24 causes them to move radially-outwardly to their extended, operative, positions against the effort of the coil springs 27. With such loss of pressure in the chamber 20, the spring 21 and the counterweights 22 bias the piston 16 to the right in the drawing and thus the blades 13 in the pitch-coarsening direction. But for the provision of the stops means formed by the plungers 24 and the provision of the shoulder 23, the blades would move to the feathered condition. However, since following such failure the piston 16 can move to the right in the drawing only until the extended plungers 24 come into engagement with the shoulder 23, the blades 13 are then held in a predetermined coarse pitch condition, in this embodiment 45 degrees. In this position of the blades the rotor is at a suitable pitch for continued traction of the aircraft. If the loss in liquid pressure in the chamber 20 is due, for example, to mechanical failure of the pump P supplying the liquid under pressure and the driving engine E is itself still fully operative, then the aircraft can satisfactorily proceed in its flight at cruise engine speed with the blades held at this fixed pitch of 45°.

However, if the loss in liquid pressure in the chamber 20 is due to failure of the engine itself, then with the blades initially assuming this fixed pitch position the rotor and engine will start slowing down. When the rotor falls below a predetermined speed, with the lessening centrifugal force upon the plungers 24 their springs 27 will cause them to retract into the piston 16. The coil spring 21 and the counterweights 22 are now able to urge the piston 16 further to the right in the drawing beyond the position determined by the shoulder 23 until the piston abuts the right-hand extremity 30 of the cylinder. In this position of the piston the blades 13 are now in their feathered (85 degress blade angle) condition imposing the least drag on the aircraft.

On subsequent correction of the engine fault and restarting of the engine, the regaining of liquid pressure in excess of said predetermined value in the chamber 20 will maintain the plungers 24 retracted in the piston 16 regardless of engine rotational speed and the piston, under the control of the speed-responsive governor means, will move the blades in the pitch-fining direction.

Limit of movement of the piston in the pitch-fining direction, in this embodiment 10° blade angle, is provided by the left-hand end portion of the piston 16 abutting the end wall of the cylindrical portion 17 of the hub 12.

With reference now to FIG. 2 of the drawing, the bladed rotor 111 shown is basically similar to that shown in FIG. 1, but instead of relying upon the engine for supply of pressure liquid thereto by way of transfer means, the rotor hub 112 is self-contained in that it also includes a liquid reservoir 113, which is rotatable therewith, and a pump 114 for supplying liquid under pressure to the pitch-change actuator 115. The casing 116 of the pump is rotatable with the rotor and the shaft 117 of the rotor of the pump extends through the output shaft S' of the engine E', being held fast at its right-hand end in the drawing to non-rotative engine structure. In this way the pump is operable upon rotation of the bladed rotor to draw liquid from the reservoir 113 by way of a pipe 118 and to deliver liquid under pressure to the chamber 120 of the actuator 115. Such delivery is under the control of speed-responsive governor means G' and associated valve means V' operable thereby, both governor means and valve means being hub-mounted.

Although in each of the embodiments above described with reference to the drawings the pitch-change actuator is operative under the control of speed-responsive governor means, in alternative embodiments of the invention the actuator may be operable under the control of positional control valve means, or alternatively in certain modes of operation the actuator may be under the control of speed-responsive governor means, while under other modes of operation it may be under the control of positional control valves means.

Further, although in each of the embodiments above described with reference to the drawing the plungers in the piston of the pitch-change actuator are retractable and extendable automatically, in alternative embodiments it may be desirable also to arrange for those plungers to be controlled at will in at least one direction of radial movement by electro-magnetic means, by independent fluid pressure pilot means, or by suitable mechanical means.

Although in each of the embodiments above described with reference to the drawing the biassing means of the bladed rotor comprises a spring and counterweights, in alternative embodiments of the invention only a spring, or again only counterweights, may be provided. The spring need not be a mechanical spring as in certain embodiments it may take the form of an hydraulic spring device.

Further, although in each of the embodiments above described with reference to the drawing the engine driving the bladed rotor is of the reciprocatory piston kind, in other embodiments the engine may instead be of rotary piston kind, or again, may be a gas turbine engine.

Again, although in each of the embodiments above described with reference to the drawing the pitch-change actuator is of piston-and-cylinder form, in other embodiments the actuator may be of rotary form, for example, of the vane-type or balanced-vane-type.

Finally, the invention is not limited in its application to control means for use in bladed rotors of ducted propulsors for aircraft, as in other embodiments such control means may with advantage be applied to any other installation where the movement of an actuator is required to be arrested at a predetermined position following the reduction of fluid pressure applied thereto below a predetermined value.

I claim:

1. A bladed rotor including a hub and adjustable blades carried by the hub, said hub having control means, for effecting pitch-adjustment of said blades, which comprises an actuator and connecting means for operably connecting the actuator to the blades, said actuator comprising two co-operable and relatively-movable components, biassing means urging one of said components in one direction toward one end-of-stroke-defining position for adjusting pitch in one sense, fluid pressure means for moving said one component in the opposite direction toward the other end-of-stroke-defining position, against the action of said biassing means, for adjusting pitch in the other sense, stop means which are carried by and movable with said one component and which are movable, under centrifugal force, relative to said one component between an inoperative position and an operative position, spring means biassing the stop means toward their inoperative position in which position they are retracted in said one component, means for applying said fluid pressure to said stop means to urge the stop means to their inoperative position, said stop means being maintained in said inoperative position by the fluid pressure of said fluid pressure means when said fluid pressure is above a predetermined value, but when, with said rotor rotating above a predetermined rotational speed, said fluid pressure falls below said predetermined value, the stop means are displaced, solely under centrifugal force and against the bias of said spring means, to their operative position, in which position they project outwardly from said one component, and abutment means, forming part of the other of said components, which is disposed at a predetermined position intermediate said end-of-stroke-defining positions, which lies in the path of said stop means when said stop means are projecting from said one component, and which serves, upon said stop means coming into engagement therewith, to cause arrest of said one component only when that component is moving in said one direction and has not yet reached said one end-of-stroke-defining position.

2. A bladed rotor as claimed in claim 1, wherein said other component includes further abutment means corresponding to said one end-of-stroke-defining position, and when, with said fluid pressure below said predetermined value and said stop means so engaging the first-mentioned abutment means, the rotational speed of the rotor falls below said predetermined rotational speed, resultant reduction in centrifugal force on said stop means enables said spring mean, to urge the stop means to their inoperative position, so that said biassing means can then urge said one component into engagement with said further abutment means.

3. A bladed rotor as claimed in clam 1, wherein the said one sense of pitch-adjustment is in the blade pitch-coarsening direction.

4. A bladed rotor as claimed in claim 1, wherein said actuator comprises a cylinder, formed by the hub of said bladed rotor, and a piston, one end face of which is subjectable to said fluid pressure, said piston being reciprocable in the cylinder and connected to effect blade pitch-adjustment.

5. A bladed rotor as claimed in claim 4, wherein said biassing means includes a coil spring, which bears upon said piston, and blade-mounted counterweights.

6. A bladed rotor as claimed in claim 1, wherein said actuator is so constructed as to be connectible to a source of fluid pressure disposed externally of the bladed rotor.

7. A bladed rotor as claimed in claim 1, wherein said hub contains pumping means, valve means and a reservoir, all rotatable as one therewith, said pumping means having a part thereof which is connected to non-rotative structure and held fast therewith, whereby upon relative rotation of the rotor with respect to said non-rotative structure, said pumping means draws fluid from said reservoir and discharges this fluid under pressure to said actuator by way of said valve means.

8. A bladed rotor as claimed in claim 1, said stop means comprising at least two plungers which are mounted in respective guides that are radially disposed in said one component and are slidable in said guides between said operative and inoperative positions.

9. A bladed rotor as claimed in claim 8, said one component comprising a piston which is reciprocable in said other component, both said spring means and said fluid pressure biassing said plungers radially inwardly.

10. A bladed rotor as claimed in claim 9, in which said other component comprises a pair of coaxial cylindrical portions of different diameter, said stop means comprising an annular shoulder between said two portions of said cylinder, said shoulder facing in the same direction in which said fluid pressure means biases said piston.

* * * * *